(12) United States Patent
Kato

(10) Patent No.: US 7,315,620 B2
(45) Date of Patent: Jan. 1, 2008

(54) SMALL-SIZED OPENING AND CLOSING DEVICE

(75) Inventor: Hideo Kato, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 706 days.

(21) Appl. No.: 10/764,955

(22) Filed: Jan. 26, 2004

(65) Prior Publication Data

US 2004/0156497 A1    Aug. 12, 2004

(30) Foreign Application Priority Data

Jan. 30, 2003    (JP)    ............................. 2003-022575

(51) Int. Cl.
*H04M 1/00*    (2006.01)
*H04M 9/00*    (2006.01)

(52) U.S. Cl. ............................. 379/433.13; 379/433.11; 16/303

(58) Field of Classification Search ........... 379/433.13, 379/433.11, 433.01; 455/575.3, 575.5; 16/303, 16/330, 340–342
See application file for complete search history.

(56) References Cited

U.S. PATENT DOCUMENTS 5,398,378 A * 3/1995 Lin .............................. 16/303
6,115,886 A * 9/2000 Fujita ........................... 16/330
7,007,345 B2 * 3/2006 Nakase et al. ................ 16/330
7,017,233 B2 * 3/2006 Hsu et al. ...................... 16/324
2001/0053674 A1 * 12/2001 Katoh ........................... 455/90

FOREIGN PATENT DOCUMENTS

JP    2000-337008    12/2000

* cited by examiner

*Primary Examiner*—Curtis Kuntz
*Assistant Examiner*—Phylesha L Dabney
(74) *Attorney, Agent, or Firm*—Notaro & Michalos PC

(57) ABSTRACT

A small-sized opening and closing device which relatively connects a first member and a second member with each other to open and close, and is composed of a shaft, a cam member attached to said shaft, a slider cam attached slidably to said shaft facing to said cam member; a compression spring wound around said shaft to push said slider cam toward said cam member side, and wherein said cam member and said cam slider each having two kinds of cam portions located on an axial core side and an outer circumferential side.

10 Claims, 20 Drawing Sheets

SMALL-SIZED OPENING AND CLOSING DEVICE

BACKGROUND OF THE INVENTION

1. Field of the Invention

The present invention relates to a small-sized opening and closing device well fitted especially to a foldable small-sized electronics device such as a portable telephone or a personal digital assistant, and so forth.

2. Description of the Related Art

Among small-sized electronics devices, as is a portable telephone, for example, there is a foldable type in which a transmitter section as a first member and a receiver section as a second member are constructed separately, and then relatively connected to open and close by means of a small-sized opening and closing device to which both members are attached to the connecting portion. Such a small-sized opening and closing device is publicly known as shown in Japanese Patent Laid-open No. 2000-337008.

The small-sized opening and closing device described in the above document has a structure that has a shaft which has an arresting portion on one end, a case body with a baffle, to which the shaft is inserted in the central axial direction and is arrested to the mentioned arresting portion, a slider cam which has a cam portion, which is slidably arrested in an axial direction to a key groove which is provided at an open end side of the mentioned case body, and is composed of a pair of a convex portion and a concave portion which is provided at a 180 degrees symmetric position on one end phase, and to which the mentioned shaft is inserted in the central axial direction, a cam member which has a cam portion composed of a pair of a concave portion and a convex portion which is provided at a 180 degrees symmetric position on an end section facing to the cam portion of the slider cam, and to which the mentioned shaft is inserted in the central axial direction, and a compression spring which is wound around the mentioned shaft, stored in the mentioned case body, and is interposed resiliently between this case body and the mentioned slider cam.

SUMMARY OF THE INVENTION

A portable telephone which is publicly known in the prior art, has an advantage that there is no tilt or twist because a shape of each cam portion is 180 degrees symmetry, and has a structure that a transmitter section and a receiver section can be opened from the closed position of which the closing angle is 0 (zero) degree to the full open position of which the opening angle is 160 degrees. Furthermore, the small-sized opening and closing device which is publicly known in the prior art has a structure that, the receiver section closes automatically relative to the transmitter section by the resilient force of the compression spring from the closing angle of 20 degrees to 0 (zero) degree, but actually it tries to close up to minus 10 degrees, so it is locked in the stopped state and is not clapped out. When the receiver section opens relative to the transmitter section, it has a structure that opens automatically from the opening angle of 140 degrees to the full open position of 160 degrees, but actually it tries to open up to 170 degrees, so it is locked at the full open state of 160 degrees, and is not clapped out. That is, from minus 10 degrees to 170 degrees, the totaled angle becomes 180 degrees. This means that by changing the shape and the position of the convex portion and the concave portion of each cam, a convex portion of one cam portion is in the status that does not completely fall in to a concave portion of the other cam portion.

Therefore, the small-sized opening and closing device which is publicly known in the prior art has problems that it is hard to have a structure to open more than 160 degrees, with an automatic closing and automatic opening function, hence has a limit in the automatic opening and closing angle or its movement, and it is hard to change the specification.

The object of the present invention is to provide a small-sized opening and closing device especially for a portable telephone, which has a different specification from the former one in the automatic opening and closing angle of the receiver section relative to the transmitter section and its movement, and the opening angle is not limited to 160 degrees.

The following explanation is for the case when the present invention is applied to a foldable portable telephone, but it goes without saying that the hinge device concerning to the present invention can be applied to small-sized personal digital assistants or other electronics devices than the foldable portable telephone.

To accomplish the above mentioned objects, the present invention connects a first member and a second member which construct a small-sized electronics device with each other to open and close, and composed of a shaft, a cam member attached to the shaft, having a 180 degrees symmetric cam portion composed of a convex portion and a concave portion on one end phase thereof, and arrested its rotation by one connecting portion of either the first member or the second member, a slider cam attached slidably to the shaft facing to the cam member, having a 180 degrees symmetric cam portion composed of a convex portion and a concave portion on a side thereof facing the cam portion of the cam member, and arrested its rotation by the other connecting portion of either the first member or the second member, and a compression spring wound around the shaft to push the slider cam toward the cam member side, and wherein each cam portion provided on an opposed side of the cam member and the slider cam separate by the position of axial core side or the outside to provide each 180 degrees symmetric cam at a different position, at least a pair of 180 degrees symmetric cams on axial core side and the outside.

In the present invention, the slider cam is provided slidably in a cam case with a baffle on the outside, while arresting its rotation.

Also in the present invention, in order that the cam member or the cam case is to be fixed on the shaft, an arresting groove in a radial direction on a fixed portion of the shaft is provided to arrest the arresting groove with the cam member or the cam case by using a fixed pin inserted from a radial direction.

DETAILED DESCRIPTION OF THE PREFERRED EMBODIMENT(S)

Figure 1:
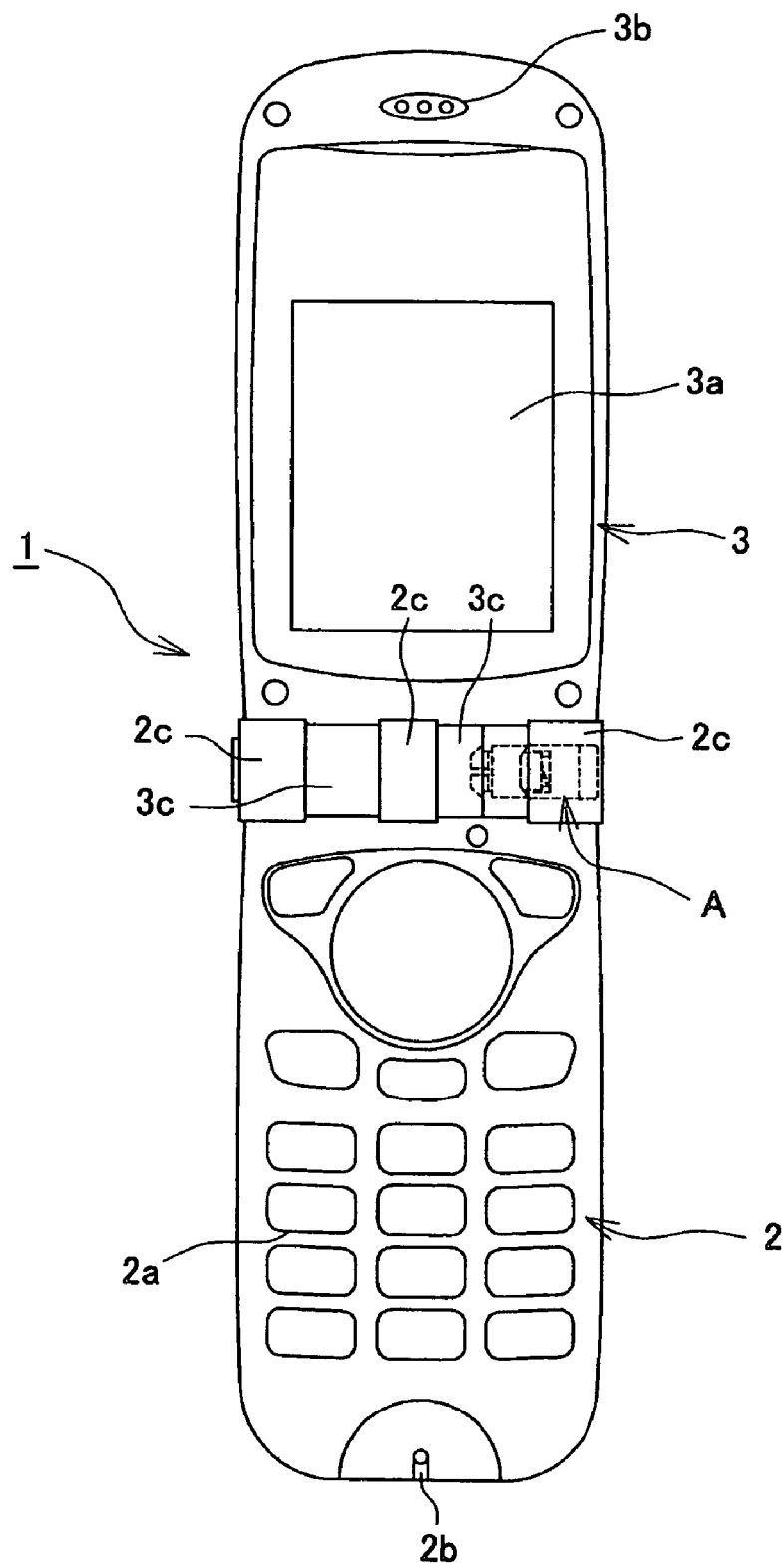
FIG. 1 is a plane view of an opened portable telephone using a small-sized opening and closing device according to the present invention.
Figure 2:
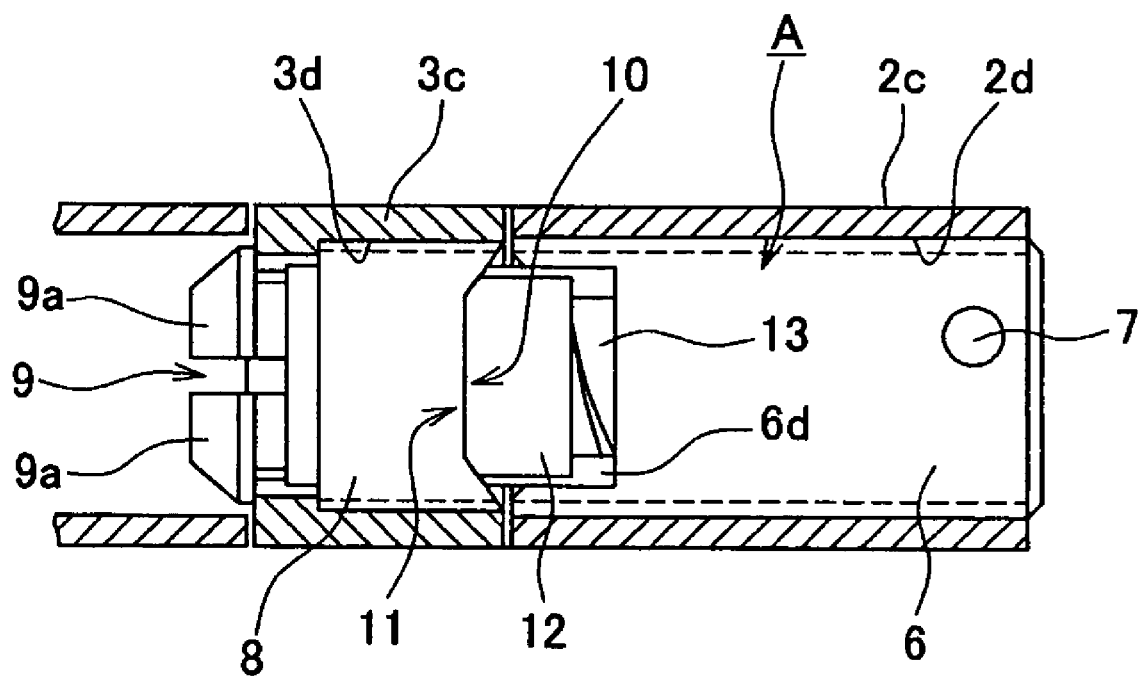
FIG. 2 is a front view showing an attached status of a transmitter section and a receiver section to each connecting portion of the small-sized opening and closing device according to the present invention.

An embodiment of the present invention will be described below in detail by referring to drawings. A reference number 1 denotes a foldable portable telephone in FIG. 1. A reference number 2 denotes a transmitter section which constructs a first member thereof, and includes a keyboard portion 2a and a microphone portion 2b. A reference number 3 denotes a receiver section which constructs a second member thereof, and includes a display unit 3a composed of, for example, a liquid crystal display unit and a speaker portion 3b.

A small-sized opening and closing device A according to the present invention, relatively connects the transmitter section 2 as the first member, and the receiver section 3 as the second member, with each other to open and close, and the device A is loaded between a connecting portion 2c, 2c of the transmitter section 2, and a connecting portion 3c, 3c of the receiver section 3. In the drawings, the small-sized opening and closing device A is used, but a pair of devices A can be used. The structure of the small-sized opening and closing device A will be described below.

Figure 3:
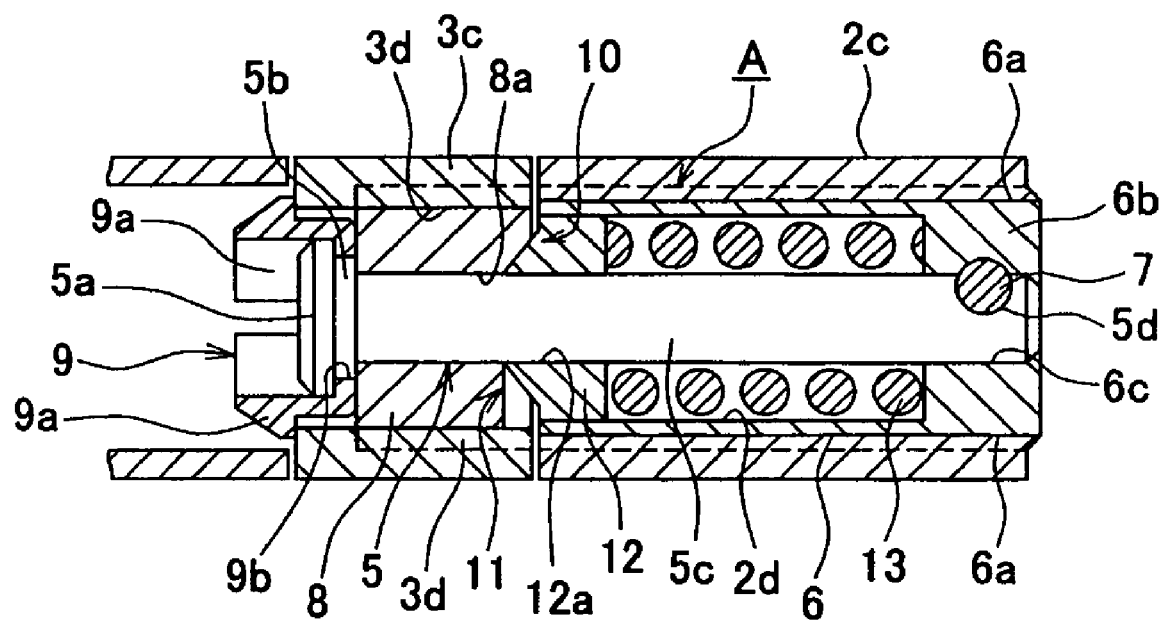
FIG. 3 is a schematic cross sectional view of the small-sized opening and closing device shown in FIG. 2.
Figure 4:
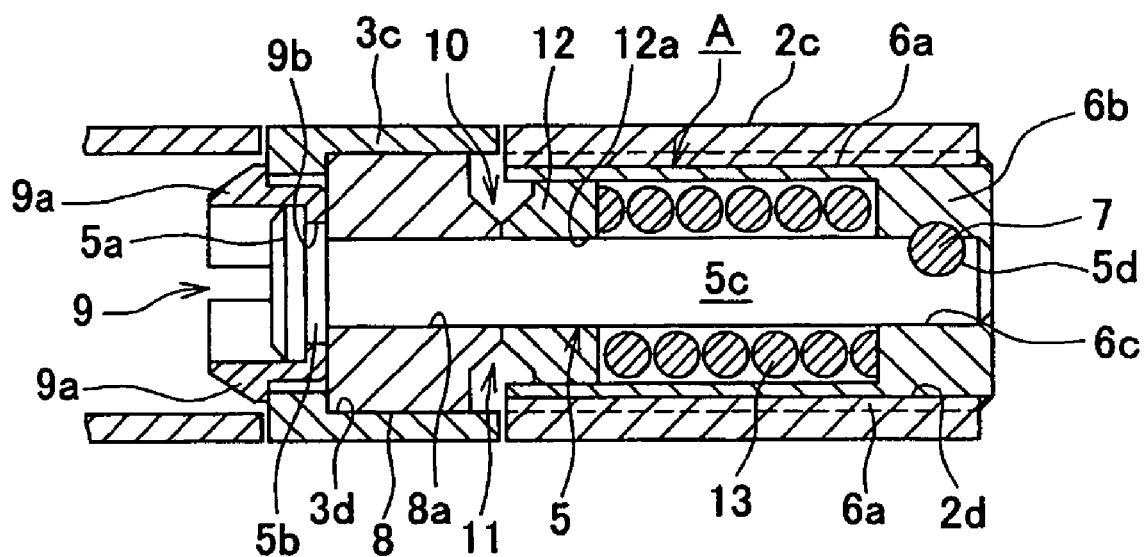
FIG. 4 is an explanatory view describing the movement of the small-sized opening closing device when the receiver section is opened relative to the transmitter section.

FIG. 2 to 16 show the small-sized opening and closing device A and parts according to the present invention, and as especially shown in FIG. 3 and FIG. 4, a reference number 5 denotes a shaft, which is made of SUM24L, and is carburized and quenched. The shaft 5 has a flange portion 5a on one end portion, followed by a medium-diameter portion 5b, and a small-diameter portion 5c, and on one side of a free end side of the small-diameter portion 5c, there is provided an arresting groove 5d extending across in an axial direction.

A reference number 6 denotes a case body. As especially shown in FIG. 2 to FIG. 5, the case body 6 has an anti-rotation means 6a, 6a which is composed of a pair of races on an outer periphery along the axial direction, and one end thereof is open, in which an axial bearing hole 6c provided on a side wall 6b receives therein the small-diameter portion 5c of the shaft 5, and the arresting groove 5d engages with a fixed pin 7 with it being arrested to the case body 6 so as not to come off in an axial direction. Of course, the arresting groove 5d may be an arresting hole in a case that the diameter of the shaft 5 is large. On the small-diameter portion 5c of the shaft 5, a cam member 8 is attached, while the small-diameter portion 5c engageably passes through a through hole 8a. To the flange portion 5a and the medium-diameter portion 5b of the shaft 5, an arresting member 9 which has four arresting claws 9a is engaged, by arrestedly passing through an arresting hole 9b. On an outside of the cam member 8, the anti-rotation means 8b, 8b which is composed of a race, 8b is provided.

At the other open end portion of the case body 6, a slider cam 12 is allocated, while the small-diameter portion 5c of the shaft 5 slidably passes through a through hole 12a, which is provided in the central axial direction thereof. Between the slider cam 12 and the side wall 6b of the case body 6, a compression spring 13 is interposed resiliently, while it is spirally wound around the small-diameter 5c, and the slider cam 12 is constantly pushed toward the cam member 8 side.

Figure 12:
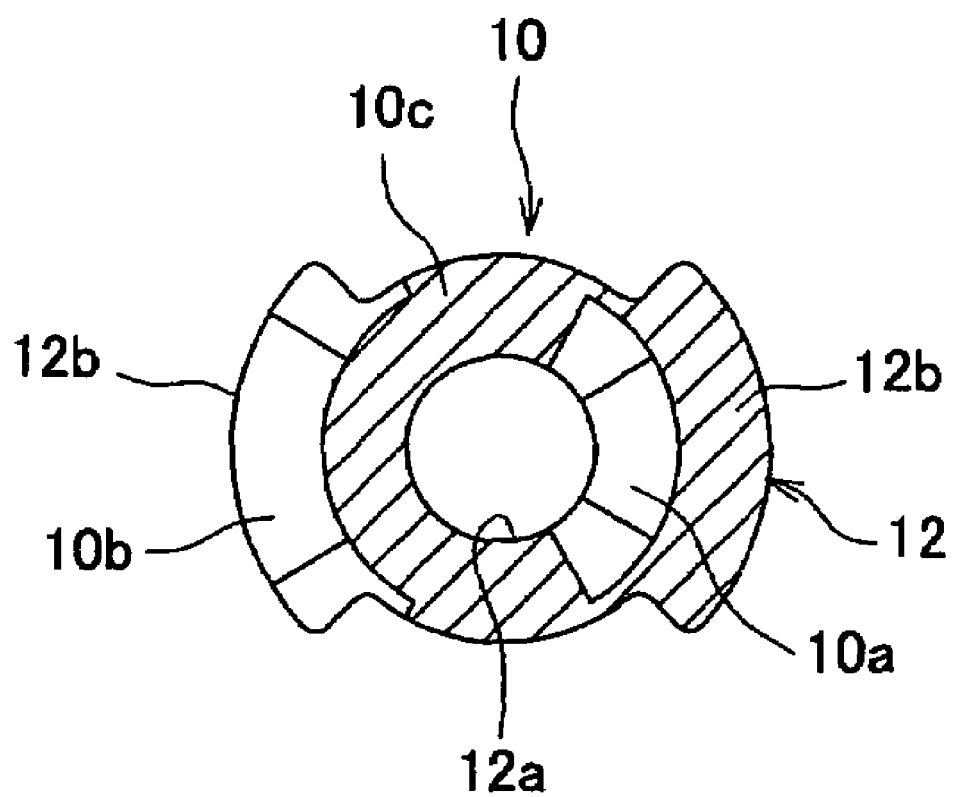
FIG. 12 is a left side view of the slider cam.
Figure 13:
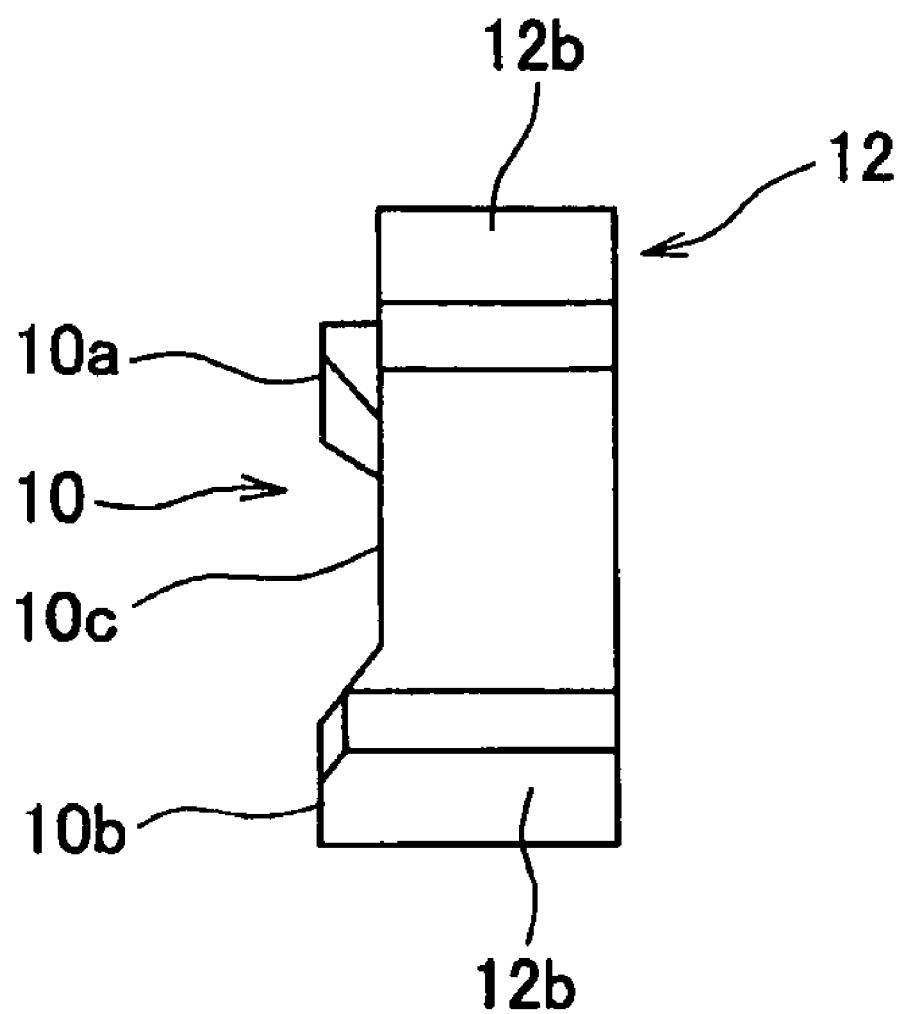
FIG. 13 is a bottom view of the slider cam.
Figure 14:
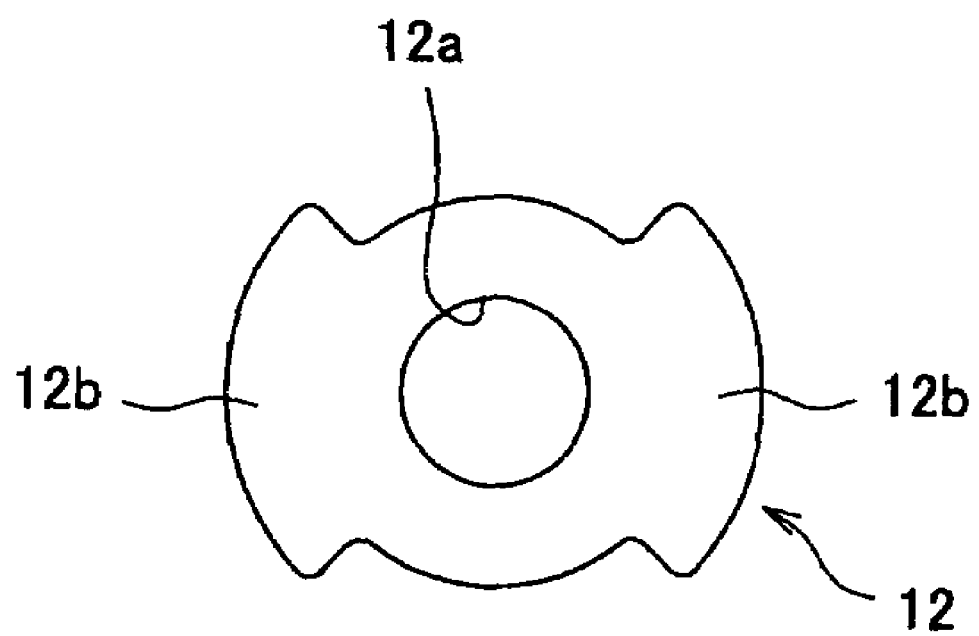
FIG. 14 is a right side view of the slider cam.
Figure 15:
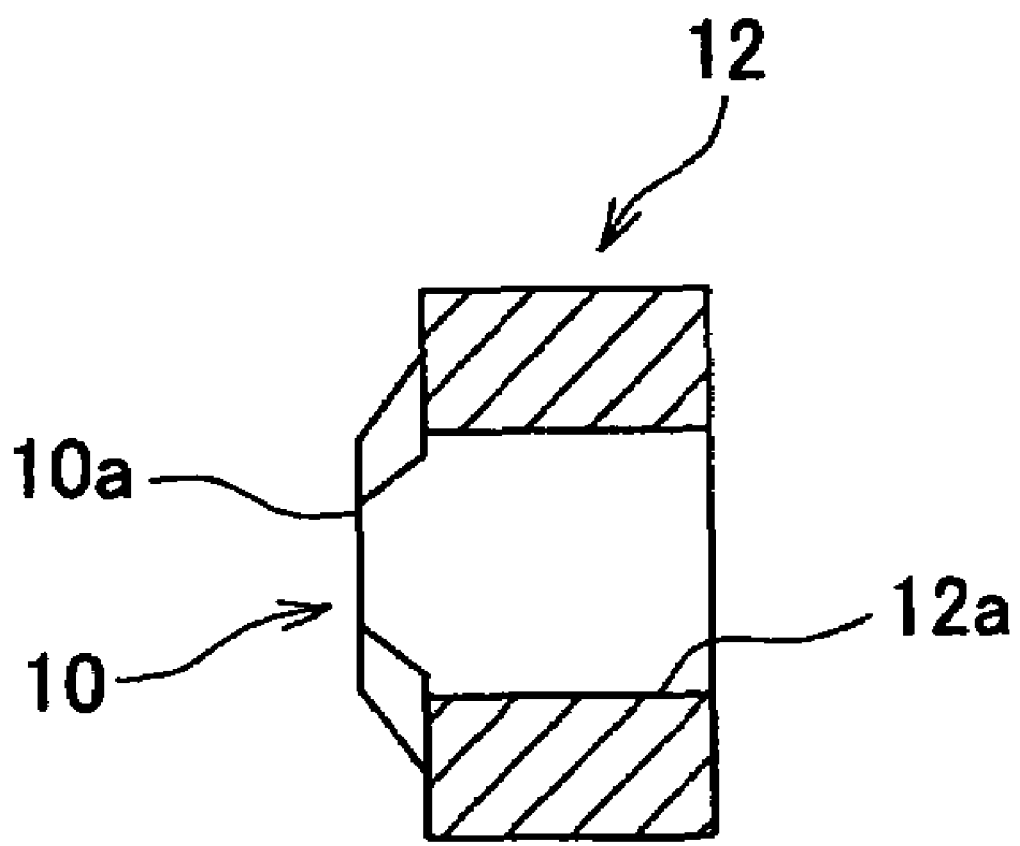
FIG. 15 is a sectional front view of the slider cam.
Figure 16:
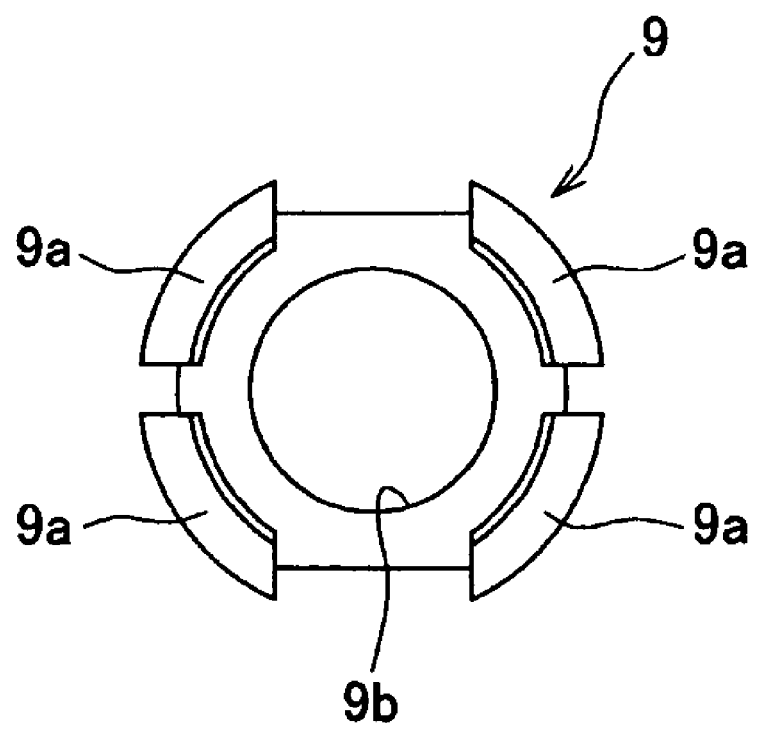
FIG. 16 is a left side view of an arresting member.

On the outside of the slider cam 12, a key portion 12b, 12b is provided to engage with a key groove 6d, 6d which is provided on the case body 6 and there is also provided a cam portion 10 at a surface confronting to the cam member 8. The cam portion 10 is composed of an inner cam convex portion 10a, which consists of a convex portion provided at an axial core side, and an outer cam convex portion 10b, which consists of a convex portion provided at 180 degrees point from the inner cam convex portion 10a. In FIG. 12, the shaded area denotes a common concave portion 10c. A cam portion 11 of the cam member 8 is provided with facing to the cam portion 10 of the slider cam 12, and the cam portion 11 is composed of an inner cam 11c, which locates inside of the axial core side and consists of a convex portion 11a, 11a and a concave portion 11b, 11b, and an outer cam 11f, which locates at 10 degrees outside point and consists of a convex portion 11d, 11d and a concave portion 11e. On sliding portion of each cam portion, 10 and 11, some viscosity lube oil such as silicone oil are applied, though it is not shown in the drawings.

And, as especially shown in FIG. 1 to FIG. 5, the small-sized opening and closing device A is inserted into a deformed mounting hole 2d which is provided at the connecting portion 2c of the transmitter section 2 from the arresting member 9 side, the cam member 8 side is inserted to a deformed mounting hole 3d which is provided at the connecting portion 3c of the receiver section 3 to thereby engage them through each anti-rotation means 8b, 8b, the case body 6 side is inserted to the deformed mounting hole 2d which is provided at the connecting portion 2c of the transmitter section 2 so as to engage them through the anti-rotation means 6a, 6a, and then the arresting claw 9a, 9a of the arresting member 9, engage with edge portion of the connecting portion 3c, then the assembling of the small-sized opening and closing device A into the portable telephone 1 is completed.

Figure 5:
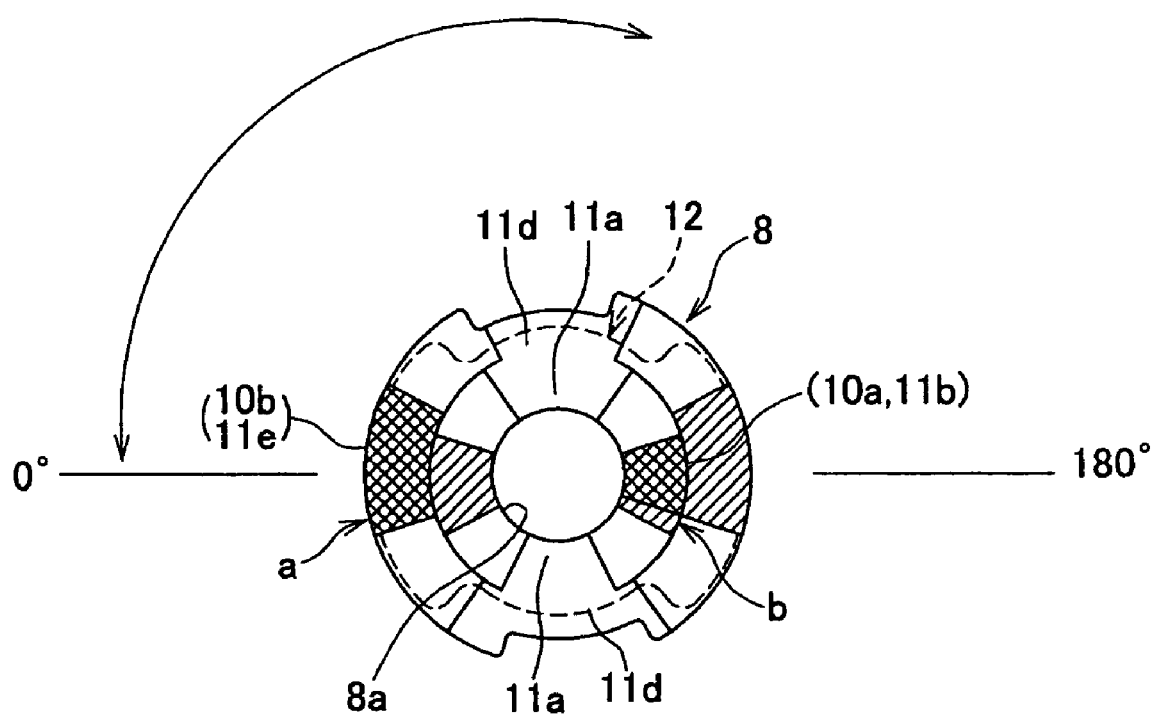
FIG. 5 is an explanatory view describing the position of a cam member and each cam portion of a slider cam when the receiver section is closed relative to the transmitter section.
Figure 6:
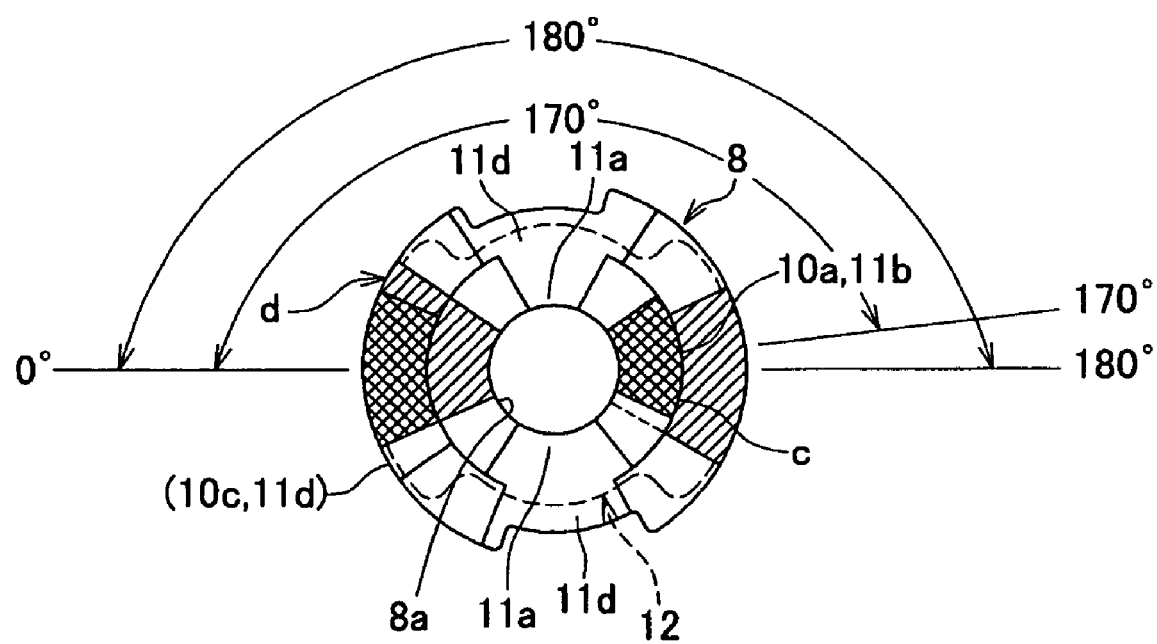
FIG. 6 is an explanatory view describing the position of the cam member and each cam portion of the slider cam when the receiver section is 170 degrees opened relative to the transmitter section.
Figure 7:
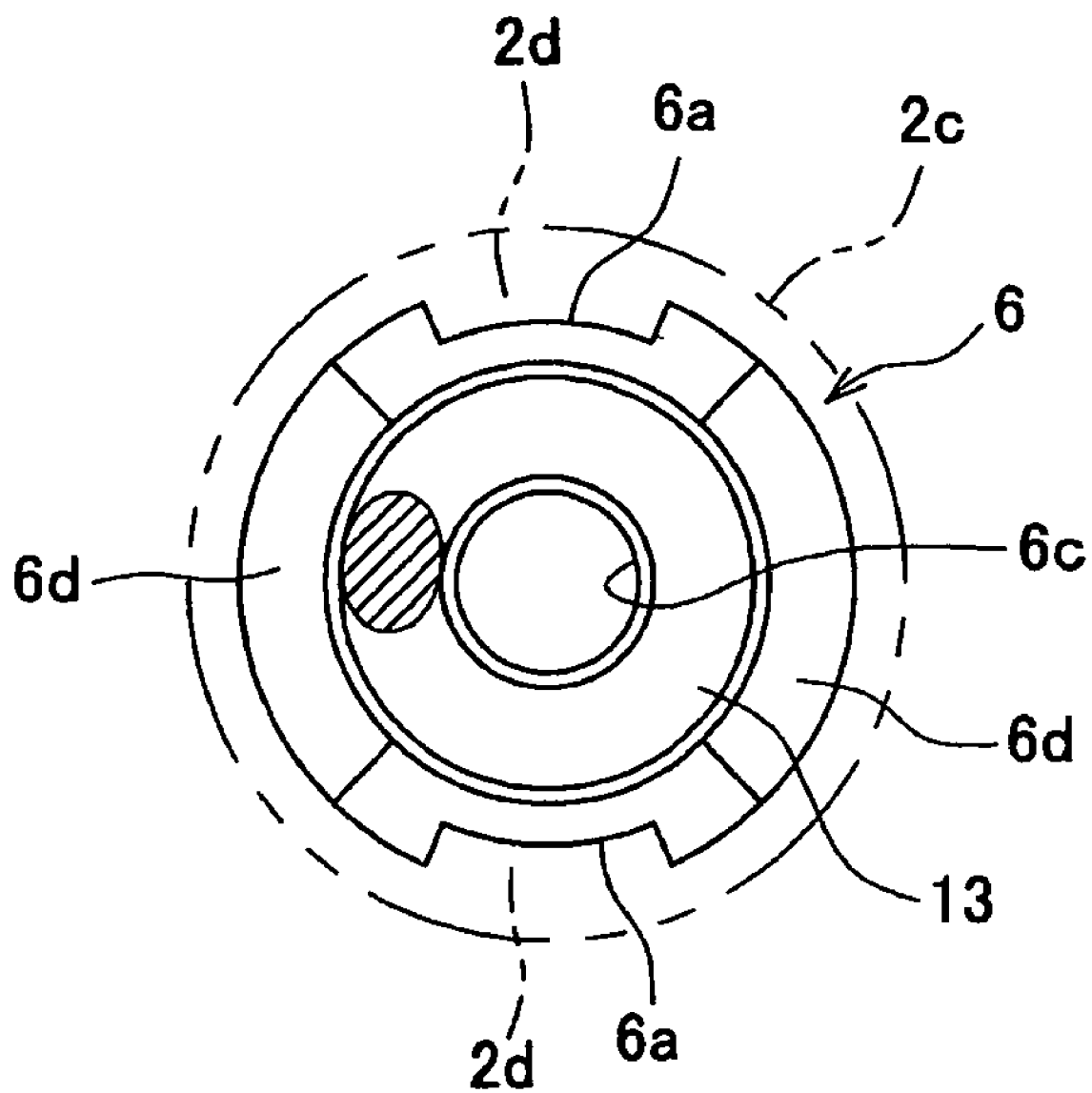
FIG. 7 is a left side view of a case body.
Figure 8:
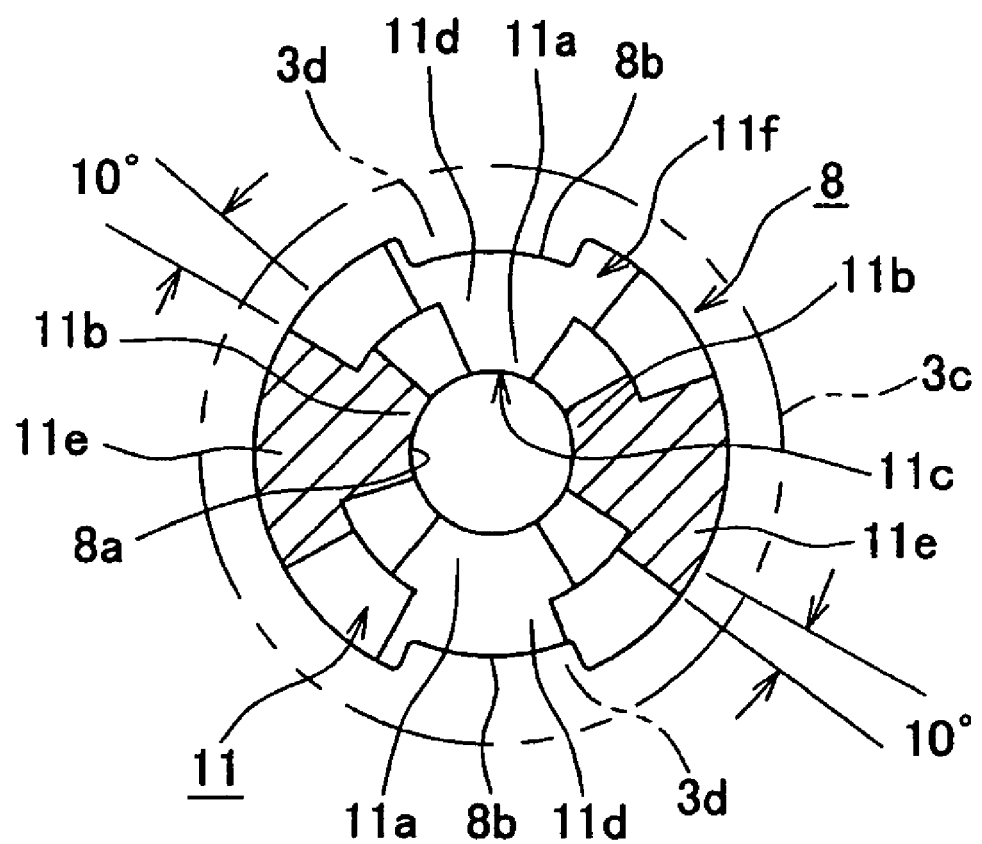
FIG. 8 is a right side view of the cam member.
Figure 9:
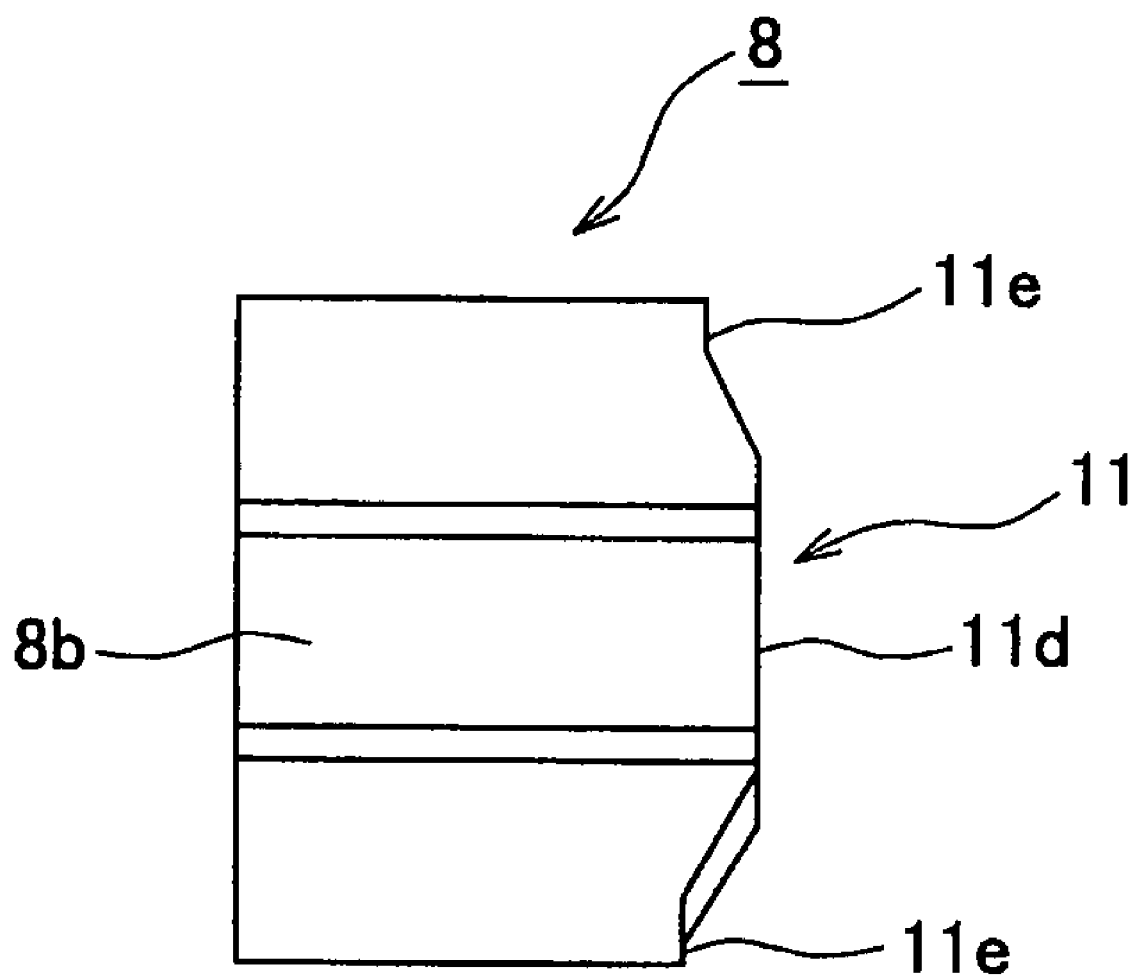
FIG. 9 is a plane view of the cam member.
Figure 10:
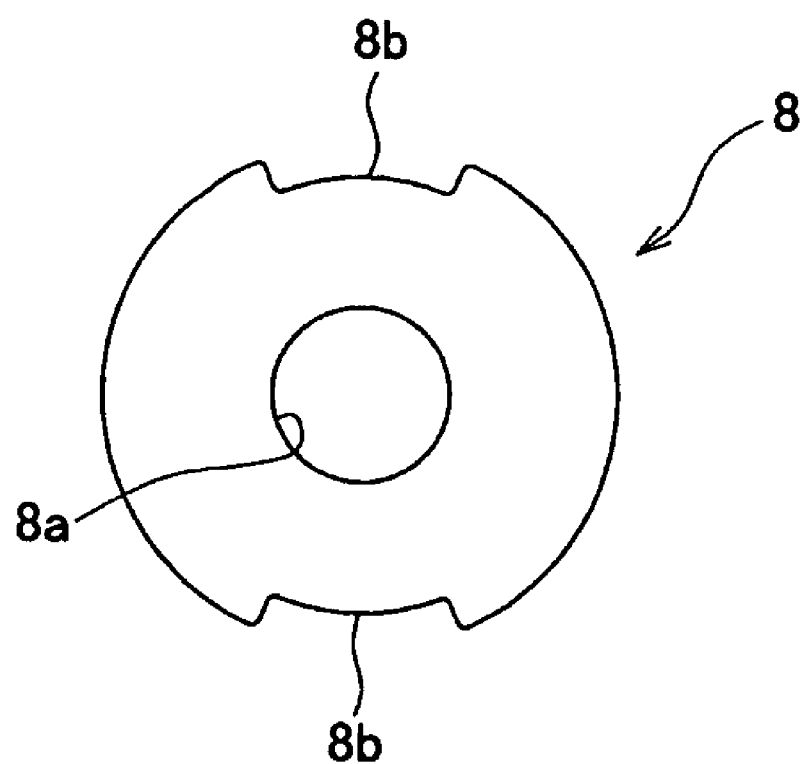
FIG. 10 is a left side view of the cam member.
Figure 11:
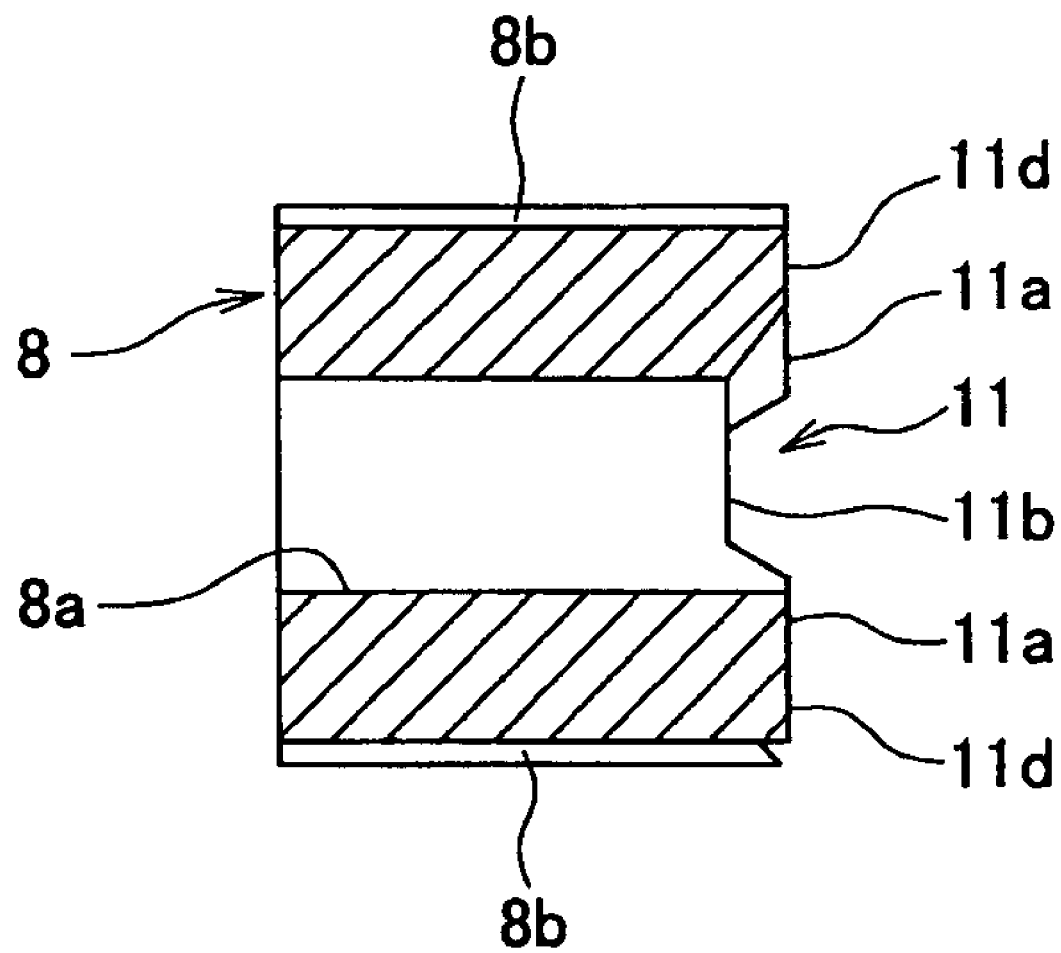
FIG. 11 is a sectional front view of the cam member.

Therefore, in a 0 (zero) degree state where the receiver section 3 as the second member is closed relative to the transmitter section 2 as the first member, as denoted by a reference line "a" in FIG. 5, the outer cam convex portion 10b of the cam portion 10 of the slider cam 12 is completely fall in the concave portion 11e of the outer cam 11f of the cam portion 11 of the cam member 8, but as denoted by a reference line "b", the inner cam convex portion 10a of the cam portion 10 of the slider cam 12 is partially fall in the concave portion 11b of the inner cam 11c of the cam portion 11 of the cam member 8. This means that there is a gap of 10 degrees. Therefore, the receiver section 3 is locked in the stopped state relative to the transmitter section 2, because it tries to close for more 10 degrees.

From this status, the receiver section 3 as the second member opens relative to the transmitter section 2 as the first member, then the cam member 8 is opened by rotating with the connecting portion 3c of the receiver section 3. When it opened up to 150 degrees, the convex portion 11d of the outer cam 11f of the cam portion 11 of the cam member 8 falls in the common concave portion 10c side of the cam portion 10 of the slider cam 12, and the receiver section 3 will be opened automatically by the resilient force of the compression spring 13, and will be stopped at the opening angle of 170 degrees, by the stopper which is not shown in the drawings. At this time, the inner cam convex portion 10a of the cam portion 10 of the slider cam 12, as denoted by a reference line "c" in FIG. 6, completely falls in the concave portion 11b of the inner cam 11c of the cam member 8, and the convex portion 11d of the outer cam 11f of the cam portion 11, as denoted by a reference line "d" in FIG. 6, does not completely fall in the common concave portion 10c of the cam portion 10, so it tries to open up to 180 degrees which is 10 degrees over, then the receiver section 3 is locked at the opening angle of 170 degrees relative to the transmitter section 2, and is not clapped out.

When the opened receiver section 3 is being closed relative to the transmitter section 2, the convex portion 11a of the inner cam 11c of the cam portion 11 of the cam member 8 and the convex portion 11d of the outer cam 11f fall in the common concave portion 10c of the cam portion 10 of the slider cam from the closing angle of 20 degrees, then it closes automatically by the resilient force of the compression spring 13, and at the closing angle of 0 (zero) degree, the convex portion 11d of the outer cam 11 of the cam portion 11 of the cam member 8 is on the point that completely fall in the common concave portion 10c of the slider cam 12, but the convex portion 11a of the inner cam 11c of the cam portion 11 of the cam member 8 is in the middle of the common concave portion 10c of the cam portion 10 of the slider cam 12, and it has room to close until minas 10 degrees, so the receiver section 3 is locked in a closed state relative to the transmitter portion 2, and is not clapped out.

In addition, when the opening angle of the receiver section 3 relative to the transmitter section 2 is from 20 degrees to 150 degrees, the inner cam convex portion 10a of each cam portion 10, the outer cam convex portion 10b, the inner cam 11c of the cam portion 11, each convex portion 11a of the outer cam 11f, and 11d are crimping and sliding, and it can be stopped in a free stopping way.

In another embodiment, the cam portion 11 which is provided on the cam member 8 side and the cam portion 10 which is provided on the slider cam 12 side can be reversed, or the convex portions which are to be provided at 180 degrees symmetric position of both inner and outer sides one by one, can be provided at 180 degrees symmetric position pair by pair. The cam member 8 can be fixed on the connecting portion 2c of the transmitter section 2, and the case body 6 can be fixed on the connecting portion 3c of the receiver section 3. The case body 6 can be omitted and in stead the slider cam 12 is to be slidably engaged with the shaft 5 in the axial direction while arresting its rotation. Furthermore, by changing each shape and the setting position of the inner cam portion and the outer cam portion of the cam portion 10, and the inner cam and the outer cam of the cam portion 11, the first member and the second member can be opened more than the angle of 180 degrees, while the advantage is held even if a 180 degrees symmetric cam is used.

Figure 17:
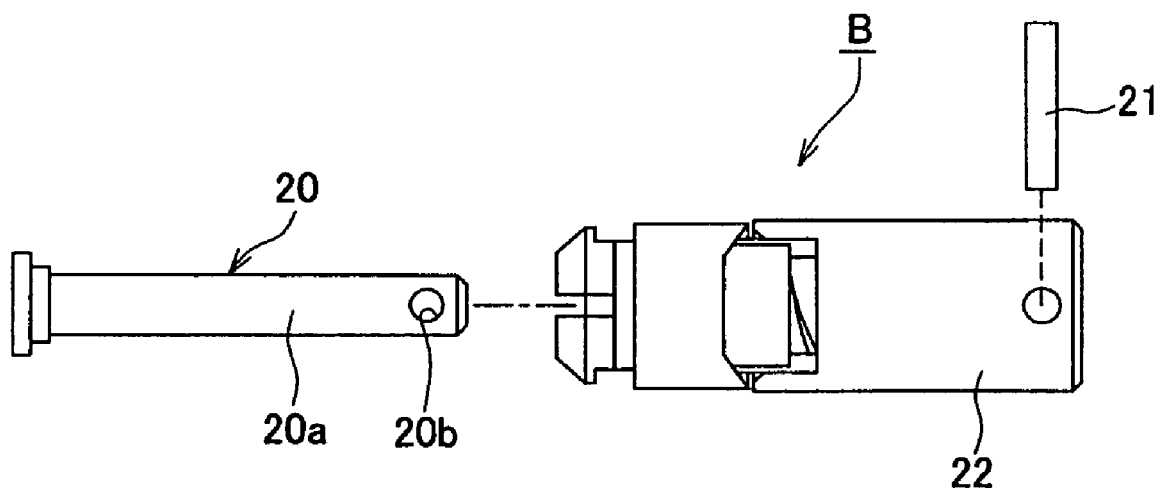
FIG. 17 is a partial disassemble elevation view showing another embodiment of the small-sized opening and closing device according to the present invention.

FIG. 17 shows another embodiment of a small-sized opening and closing device B of the present invention, and differs from the first embodiment of the small-sized opening and closing device in the point that an arresting hole 20b is provided on a free end side of a small-diameter portion 20a of a shaft 20, but others are the same. In the arresting hole 20b, a fixed pin 21 is inserted and engages the shaft 20 with a case body 22. When a diameter of a shaft is large enough to have an arresting hole to insert an arresting pin, these embodiment can be implemented.

Figure 18:
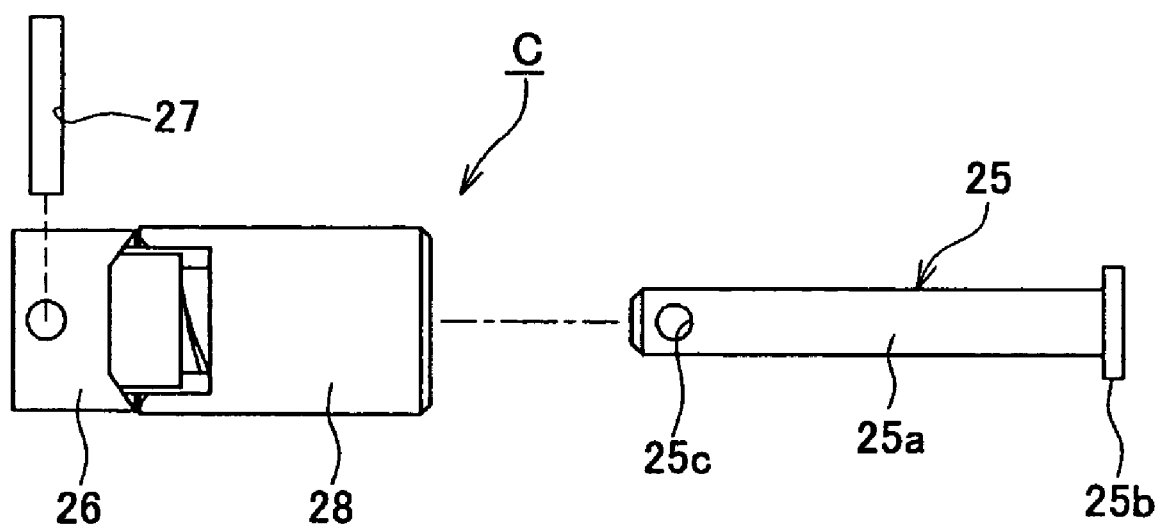
FIG. 18 is a partial disassemble elevation view showing still another embodiment of the small-sized opening and closing device according to the present invention.

FIG. 18 shows still another embodiment of a small-sized opening and closing device of the present invention, and this small-sized opening and closing device C omits arresting members, and engages an arresting hole 25c which is provided on a small-diameter portion 25a of a shaft 25 with a cam member 26 through a fixed pin 27, and a case body 28 is arrested by a flange portion 25b of a shaft 25, and these are the different points from the former embodiments. The other structure is the same as the former embodiments. The object of the present invention can be accomplished by this embodiments.

Figure 19:
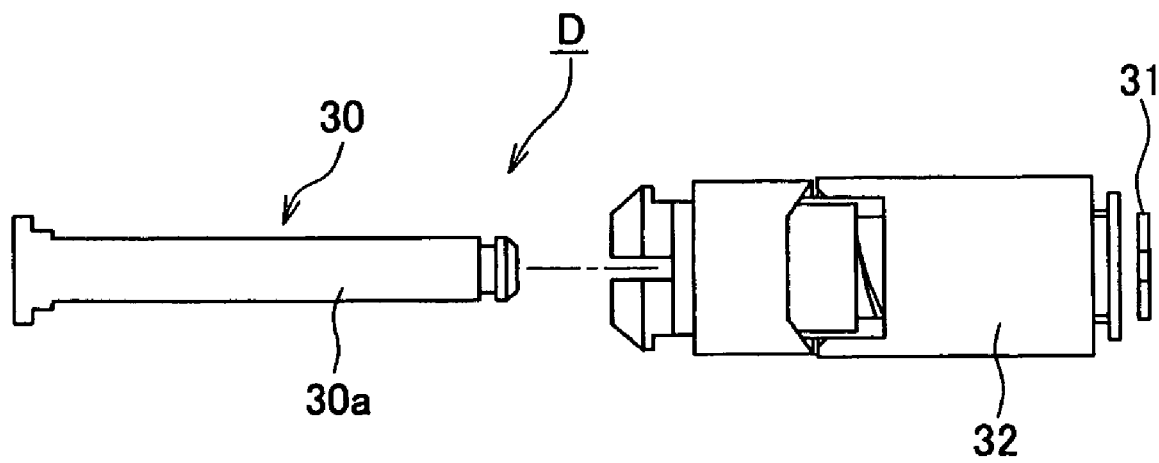
FIG. 19 is a partial disassemble elevation view showing yet another embodiment of the small-sized opening and closing device according to the present invention.

FIG. 19 shows yet another embodiment of a small-sized opening and closing device of the present invention, and in this small-sized opening and closing device D, a free end side of a small-diameter portion 30a of a shaft 30 is arrested to a case body 32 with a snap ring 31 composed of, for example, an E ring, and that is the different point from the former embodiments. The other structure is the same as the former embodiments. The object of the present invention can be accomplished by this embodiment.

Figure 20:
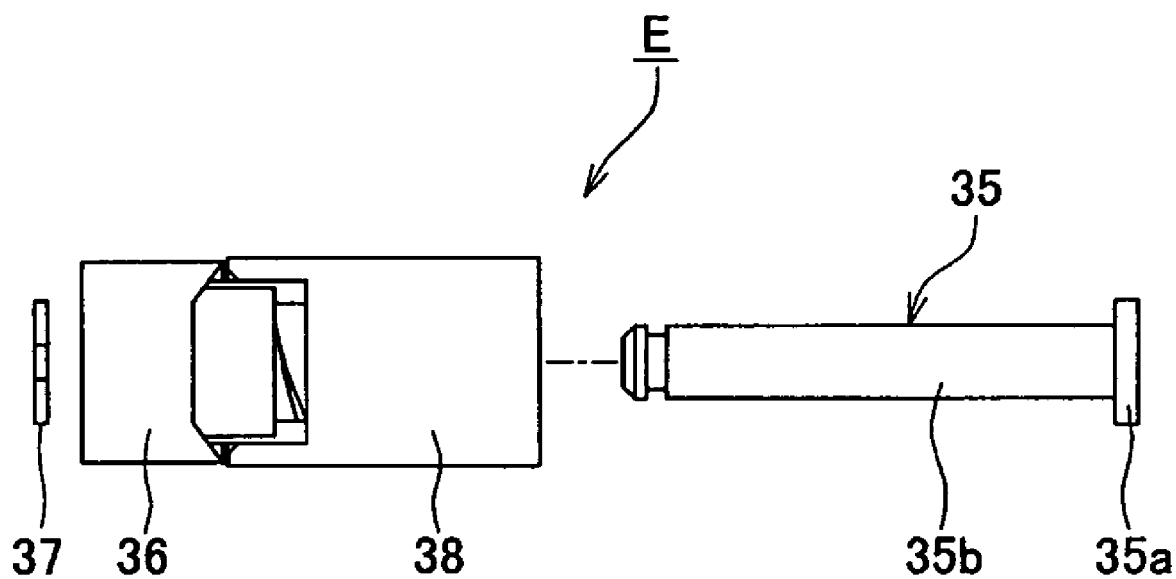
FIG. 20 is a partial disassemble elevation view showing further another embodiment of the small-sized opening and closing device according to the present invention.

FIG. 20 shows further another embodiment of a small-sized opening and closing device of the present invention, and in this small-sized opening and closing device E, a small-diameter portion 35b of a shaft 35 is arrested to a cam portion 36 with a snap ring 37 composed of, for example, an E ring, and a case body 38 is arrested with a flange portion 35 of a shaft 35, and these are the different points from the former embodiments, and the other structure is the same. The object of the present invention can be accomplished by this embodiment.

What is claimed is:

1. A small-sized opening and closing device which relatively connects connecting portions of a first member and connecting portions of a second member, which construct a small-sized electronics device, with each other to open and close, comprising:

a shaft;

a cam member attached to said shaft passing in a central axial direction, having a 180 degrees symmetric cam portion composed of a convex portion and a concave portion on one end phase thereof, and arrested its rotation by one connecting portion of either said first member or said second member;

a slider cam attached slidably to said shaft passing through in a central axial direction thereof and facing to said cam member, having a 180 degrees symmetric cam portion composed of a convex portion and a concave portion on a side thereof facing said cam portion of said cam member, and arrested its rotation by the other connecting portion of either said first member or said second member;

a compression spring wound around said shaft to push said slider cam toward said cam member side;

wherein each cam portion of said cam member is separated into an inner cam convex portion located on an axial core side and an outer cam convex portion located on an outer circumferential side, and said inner cam convex portion faces to said outer cam convex portion over an axial core portion;

wherein each cam portion of said slider cam consists of a 180 degrees symmetric inner cam comprising two pairs of convex portions located on an axial core side and concave portions, and a 180 degrees symmetric outer cam comprising two pairs of convex portions located on an outer circumferential side with one pair displaced from the other pair, and said inner cam and said outer cam are each formed with a gap in a circumferential direction relative to positions of said inner cam convex portion and said outer cam convex portion, and;

wherein said inner cam and said outer cam faces to said inner cam convex portion and said outer cam convex portion respectively.

2. The small-sized opening and closing device according to claim 1, wherein said slider cam is provided slidably in a cam case fixedly inserted into deformed mounting hole provided on connecting portions either of said first member and said second member with a baffle on the outside, while arresting its rotation.

3. The small-sized opening and closing device according to claim 2, wherein, in order that said cam member or said cam case is to be fixed on said shaft, an arresting groove in a radial direction on a fixed portion of said shaft is provided to arrest said arresting groove with said cam member or said cam case by using a fixed pin inserted from a radial direction.

4. The small-sized opening and closing device according to claim 2, wherein, in order that said cam member or said cam case is to be fixed to said shaft, an arresting hole in a radial direction on a fixed portion of said shaft is provided to arrest said arresting hole with said cam member or said cam case by using a fixed pin inserted from a radial direction.

5. The small-sized opening and closing device according to claim 2, wherein said cam case is arrested to a flange portion provided on one end portion of said shaft, and said cam member engages with an arresting hole provided on the other end portion by using said fixed pin.

6. The small sized opening and closing device according to claim 2, wherein said cam case is arrested to one end portion of said shaft by using a snap ring.

7. The small-sized opening and closing device according to claim 2, wherein said cam case is arrested to a flange portion provided on one end portion of said shaft, and said cam member is arrested to the other end portion of said shaft by using a snap ring.

8. The small-sized opening and closing device according to claim 1, wherein said gap in a circumferential direction is 10 degrees.

9. A small-sized opening and closing device which relatively connects connecting portions of a first member and connecting portions of a second member, which construct a small-sized electronics device, with each other to open and close, comprising:

a shaft;

a cam member attached to said shaft passing in a central axial direction, having a 180 degrees symmetric cam portion composed of a convex portion and a concave portion on one end phase thereof, and arrested its rotation by one connecting portion of either said first member or said second member;

a slider cam attached slidably to said shaft passing through in a central axial direction thereof and facing to said cam member, having a 180 degrees symmetric cam portion composed of a convex portion and a concave portion on a side thereof facing said cam portion of said cam member, and arrested its rotation by the other connecting portion of either said first member or said second member;

a compression spring wound around said shaft to push said slider cam toward said cam member side;

wherein each cam portion of said cam member consists of an inner cam comprising two pairs of convex portions located on an axial core side and concave portions, and a 180 degrees symmetric outer cam comprising two pairs of convex portions located on an outer circumferential side with one pair displaced from the other pair, and said inner cam and said outer cam are each formed with a gap in a circumferential direction relative to positions of said inner cam convex portion and said outer cam convex portion;

wherein each cam portion of said slider cam is separated into an inner cam convex portion located on an axial core side and an outer cam convex portion located on an outer circumferential side, and said inner cam convex portion faces to said outer cam convex portion over an axial core portion; and wherein said inner cam and said outer cam faces to said inner cam convex portion and said outer cam convex portion respectively.

10. The small-sized opening and closing device according to claim 9, wherein said gap in a circumferential direction is 10 degrees.

* * * * *